UNITED STATES PATENT OFFICE.

HANS FRANKE, OF WILSDORF, NEAR BODENBACH, AUSTRIA, ASSIGNOR OF NINETY ONE-HUNDREDTHS TO ALBERT REDLICK, OF VIENNA, AUSTRIA.

PROCESS FOR TREATING TANNING SUBSTANCES SOLUBLE WITH DIFFICULTY CONTAINED IN CRUDE QUEBRACHO LIQUORS.

1,241,950. Specification of Letters Patent. Patented Oct. 2, 1917.

No Drawing. Application filed June 26, 1914. Serial No. 847,514.

*To all whom it may concern:*

Be it known that I, Dr. HANS FRANKE, subject of the German Emperor, residing at Wilsdorf, near Bodenbach, Bohemia, Austria, have invented certain new and useful Improvements in Processes for Treating Tanning Substances Soluble with Difficulty Contained in Crude Quebracho Liquors, of which the following is a specification.

According to U. S. Letters Patent, No. 939,742, granted November 9, 1909, quebracho extracts soluble in the cold, can be obtained by heating non-treated quebracho liquors with a given quantity of an alkali for a certain time, with exclusion of air, with or without pressure, and after neutralization, separating by cooling the insoluble resin-like substances from the valuable portions soluble cold. The patent specification states that the tanning substances soluble with difficulty, which are contained in the non-treated quebracho liquors, are converted by this process into easily soluble tanning substances.

According to my observations, by cooling technical non-treated quebracho liquors to complete clarification, about 40% of the dry substance contained in the cloudy liquor, are precipitated in the form of insoluble substances. If however the liquors are first treated by the process described in the patent above referred to, the subsequent cooling produces a separation of a much smaller quantity—about 20%—of the total dry substance. The figures given are merely approximate, as the composition of quebracho liquors as regards the proportion of tanning substances soluble with difficulty, depends on the nature of the wood and on the work of extraction.

Experiments have shown that the same result can be obtained by heating crude quebracho liquors with oxids, hydroxids and salts (for instance carbonates) of alkaline earths (Mg, Ca, Sr, Ba) and subsequent neutralization. Alkaline earths have however a higher efficiency, so that the same result is obtained with considerably smaller quantities.

The treating of quebracho tanning material soluble with difficulty, with assistance of compounds of metals of alkaline earths has however another very important advantage. It is possible to remove from the liquor the substances used for the treatment, by converting them into a salt soluble with difficulty or insoluble (for instance sulfate of barium, sulfate of strontium, oxalate of calcium, etc.) In that way, products of the degree of purity of non-treated extracts are obtained, which contain only a comparatively small proportion of salts, which is of great advantage for tanning. If extracts richer in salts are used for tanning, the proportion of tanning material to salt is quickly altered during tanning, and a liquor is soon produced which contains too much salt in comparison to the tanning material. The high proportion of salt in strongly exhausted liquors produces a bad tanning, as the hides decay in the same. Tanners consider such spent liquors as absolutely useless on account of the high proportion of salts, although they still contain a comparatively high proportion of tanning material. This drawback can be obviated by using extracts poor in salts. An extract obtained by the above described new process, is superior in that respect to that obtained by alkali treatment in accordance with the patent above mentioned. The removal of the salts formed in the new process, has moreover the advantage of enabling extracts to be obtained with a correspondingly higher proportion of tanning material, which results in a saving of freight.

The ingredients which are not rendered soluble by the process, can be separated by cooling to 10–15° C. In that way, liquors are obtained which, whatever their degree of concentration, remain clear at the cooling temperature, and consequently give after concentration an excellent extract soluble in the cold.

With reference to the carrying out of the process, it must be pointed out that hot liquors stirred with oxids, hydroxids or salts (for instance carbonates) of alkaline earths to a porridge, are heated for a long time with exclusion of air, in autoclaves, preferably to about 130° C. For one hectoliter of liquor, it is sufficient to add about 10–15 gr. of caustic lime (CaO) or approximately the equivalent quantity of another of the substances mentioned. After the reaction is completed, a quantity of acid (for instance acetic acid, hydrochloric acid, etc.) equivalent to the compound introduced, is added, or, if it is intended to obtain a liquor poor in salts, an acid which forms with the alkaline earth utilized, an insoluble salt or a salt soluble with difficulty, which is preferably removed from the liquor by hot filtration.

The insoluble substances thereby precipitated, can be separated from the soluble ones by subsequent cooling and clarifying.

The deposit, the quantity of which, as stated, is about 20%, contains of course varying quantities of easily soluble tanning material or tanning material soluble with difficulty which escaped the reaction, since it would be difficult and tedious to consider in every single case the fluctuating proportion between easily soluble tanning materials and those soluble with difficulty, in order to calculate accordingly in a more accurate manner the required quantities of the effective substance. The greater portion of the tanning material soluble with difficulty, can be converted into soluble form by a further treatment. Insoluble substances resisting this treatment, can be dissolved by the well known "sulfiting" and represent then a tanning material which, though it can be used, does not possess the eminent tanning properties of the main portion soluble in the cold.

What I claim as my invention and desire to secure by Letters Patent is:—

1. The process of treating crude quebracho liquors containing difficultly soluble tanning substances, which comprises heating such liquor while air is excluded therefrom with an alkaline compound of alkaline earths of a character capable of complete conversion by a suitable acid into an insoluble salt, neutralizing the liquor by adding thereto the required quantity of acid, and separating the liquor from the insoluble residue.

2. The process of treating crude quebracho liquors containing difficultly soluble tanning substances, which comprises heating such liquor while air is excluded therefrom with an alkaline compound of alkaline earths capable of complete conversion into an insoluble salt by a suitable acid, neutralizing such liquor by adding thereto an acid of a character which will combine with said alkaline earths to form an insoluble salt, and separating such liquor from the insoluble residue.

In testimony whereof I have hereunto set my hand in presence of two subscribing witnesses.

Dr. HANS FRANKE.

Witnesses:
 Leo Bergholz,
 Paul Arras.